United States Patent [19]
Cooper et al.

[11] 3,940,731
[45] Feb. 24, 1976

[54] ULTRASONIC RANDOM SIGNAL DOPPLER FLOW MEASUREMENT SYSTEM

[75] Inventors: George R. Cooper, Lafayette; Vernon L. Newhouse, West Lafayette, both of Ind.

[73] Assignee: Purdue Research Foundation, Lafayette, Ind.

[22] Filed: Aug. 15, 1974

[21] Appl. No.: 497,614

[52] U.S. Cl............ 340/3 D; 73/194 A; 128/2.05 F
[51] Int. Cl.² ........................ G01S 9/66; G01P 5/00
[58] Field of Search............ 340/1 R, 3 D; 128/2 V, 128/2.05 F; 73/194 A

[56] References Cited
UNITED STATES PATENTS
3,766,517  10/1973  Fahrbach ............................ 340/3 D Primary Examiner—Richard A. Farley

[57] ABSTRACT

A doppler effect flow measurement device using ultrasonic stationary random noise whereby errors and inaccuracies common in existing doppler flow measurement systems are overcome.

7 Claims, 7 Drawing Figures

NOISE SOURCE SPECTRAL DENSITY

CORRELATOR OUTPUT

ULTRASONIC RANDOM SIGNAL DOPPLER FLOW MEASUREMENT SYSTEM

BACKGROUND OF THE INVENTION

The measurement of fluid velocity is important in many industrial applications such as for instance, the measurement of the speed of coolant flow through pipes, as well as in scientific and medical applications, for instance in the measurement of fluid velocity in the wakes of moving vessels or models of vessels. Provided that the fluid carries scatterers capable of reflecting ultrasound such as tiny air bubbles in the case of water or liquid starch suspensions or red blood cells in the case of blood, pulsed doppler ultrasound systems have been found to be advantageous over other means of measuring fluid velocity. In the known doppler ultrasound systems a short burst or pulse of radio frequency sound is emitted from a transducer and sent towards the moving scatterers. The reflected echo is shifted in frequency because of the doppler effect, and by processing this echo in a receiver and measuring the shifted frequency with respect to the transmitted signal it is possible to estimate the velocity of the moving scatterers and thus of the fluid that contains them. Present techniques of measuring fluid velocity around ship models for instance, involve placing detectors at various points where the velocity of the liquid is to be measured. Using a pulsed ultrasonic doppler system, if it were not for the range limitations described below, it would be possible simply by pointing the ultrasound beam in different directions and adjusting the range, to obtain the velocity at any point in a fluid with only a single instrument, and to obtain the velocity over a whole region of fluid by rapidly scanning over the region at electronic speeds.

In medical applications, pulsed doppler ultrasound systems are used at this time to measure the blood velocity in peripheral blood vessels, i.e., vessels that lie close to the skin, with the transducer being positioned outside the body. This is a much more pleasant and convenient way of measuring blood velocity than other known techniques which involve cutting into the skin. It would be convenient and advantageous if it were possible to use this known technique to measure the blood velocity in vessels which are deeper in the body such as those near the heart, but this is at present impossible because of the range limitations of pulsed doppler systems.

SUMMARY OF THE INVENTION

In a typical pulsed doppler system the transmitter transducer emits pulses of radio frequency ultrasound having a known frequency which pulses are reflected from the moving scatterers and are picked up by the receiver tranducer in the form of a frequency shifted echo. The amplified echo is compared with a time gated sample of the transmitted signal in the phase comparator and the output of that circuit when passed through a low pass filter gives rise to the doppler shift frequency, whose frequency is proportional to the velocity of the scatterers. The width of the region from which such a system can receive echoes is determined by the time duration of the transmitted signal which is therefore kept as short as possible. The range of the point from which the system is receiving signals is determined by the time duration between the transmission of the signal and the receipt of the echo. If pulses are transmitted at too rapid a rate, the system suffers from range ambiguities. This is because it is unclear whether a particular echo corresponds to the most recently transmitted pulse reflected from a distant target or whether it corresponds to the echo of a pulse transmitted earlier, reflected from a closer target.

DETAILED DESCRIPTION OF THE INVENTION

Figure 1:
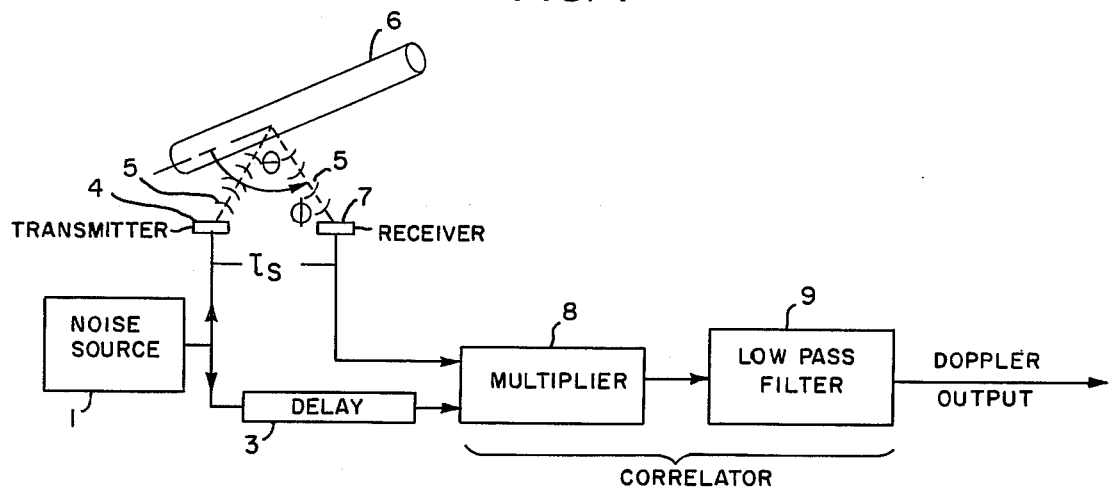
FIG. 1 is a diagrammatic representation of one embodiment of the invention that employs two transducers.

For pulsed doppler systems which emit a single frequency burst of duration $\tau$ at a repetition rate $f_r$, avoidance of range ambiguities makes it necessary to wait for the return of the echo from the most distant target before transmitting another burst.

Thus:

$$f_r < \frac{c}{2R_{max}} \quad \text{Equation (1)}$$

where $c$ is the sound velocity and $R_{max}$ the maximum useful range. Furthermore the output doppler frequency is obtained from samples at the system repetition rate, $$F_r > 2f_D, \quad \text{Equation (2)}$$

where $f_D$ is the maximum frequency of the output doppler spectrum.

Combining the above two relations with the doppler equation $$f_D = \frac{2vf_o}{c}$$

where $v$ is the maximum velocity along the transducer axis and $f_o$ the frequency of the transmitted burst, gives $$(vR)_{max} < \frac{c^2}{8f_o}, \quad \text{Equation (3)}$$

showing that the product of the maximum observable velocity and range are limited for conventional pulsed doppler systems.

Using the known velocity of sound in water or human tissue and assuming that the transmitted frequency $f_o$ is of the order of 5 MNz, Equation 3 shows that $(vR)_{max}$ is less than 0.1. Thus at 10 centimeters range for instance, it is not possible to measure velocities larger than one meter per second. This range velocity limit of pulsed doppler systems strongly limits its usefulness not only in applications such as measuring fluid flow in industrial and scientific applications but even in medical cases since important blood vessels near the heart are at ranges of between 6 and 20 centimeters from those points at the body surface from which ultrasound can penetrate into the body.

Another limitation of pulsed doppler systems is that the duration of the transmitted burst must be kept short to maintain fine range resolution. This requirement imposes very high ratios of peak to average transmitted powers. Since the echo from a target at range $R$ gives a range delay or time of flight $$\tau_s = \frac{2R}{c}$$

it can be seen by differentiation that the range resolution $\Delta R$ for a transmitted burst of duration $\Delta \tau$ is at best $$\Delta R = \frac{c\Delta \tau}{2} \qquad \text{Equation 4}$$

In terms of the bandwidth $B$ of the transmitted signal the range resolution may be written $$\Delta R = \frac{c}{2B} \qquad \text{Equation 5}$$

as $B$ is approximately $(\Delta \tau)^{-1}$.

The ratio of peak to average transmitted power can be written:

$$\frac{P_{peak}}{P_{avg}} = \frac{\tau_r}{\Delta \tau}, \qquad \text{Equation 6}$$

where $\tau_r$ is the period of the transmitted signal, equal to the inverse of the repetition rate given in equation 1. Using the previous results, this gives:

$$\frac{P_{peak}}{P_{avg}} > \frac{R_{max}}{\Delta R} \qquad \text{Equation (7)}$$

which is equal to at least $10^2$ in any high resolution system such as those used to observe deep lying structures in the body, or distant flow in general.

Use of random signals in radar has frequently been discussed but the only known implementation was described by McGillem, Cooper and Waltman in a paper entitled "Use of Wide Band Stochastic Signals for Measuring Range and Velocity," published in the EASCON '69 Record, pp 305 – 311. Practical implementation of noise as a transmitted radar signal was previously impossible because of the difficulties of handling random signals at the high frequencies required for broadcast radar. McGillem, Cooper and Waltman overcame this problem by using a scheme in which the transmitted and received signals were sampled. This led to a high performance but relatively complex system, which involved conversion from RF to video frequencies, with sampling and delay by means of digital shift registers.

The basic components of a random signal ultrasonic doppler system which uses separate transducers for transmitting and receiving are shown in FIG. 1.

In this basic random signal doppler flow measurement system the nose source 1 produces electrical signals fed to the transmitting transducer 2 and the delay line 3. Those fed to the transducer 2 are converted into sound waves 4 whose echoes 5 from any blood vessel 6 under investigation are received by the receiving transducer 7 and converted back into electrical signals. These signals, in addition to the noise signals that pass through the delay line, are fed into the multiplier 8 and from there to the low pass filter 9 which produces the output of the system.

A continuous or intermittent noise signal is reflected by scatterers in the fluid, detected, and correlated with a delayed version of itself. If the transmitted noise signal has amplitude $x(t)$, the received echo from a single moving scatterer is of the form $A \times [(1 + \alpha)t - \tau_s]$, where $A$ is the randomly varying scattering cross section, $\tau_s$ is the signal time of flight and $$\alpha = \frac{V}{c}(\cos \theta + \cos \phi)$$

Figure 2A:
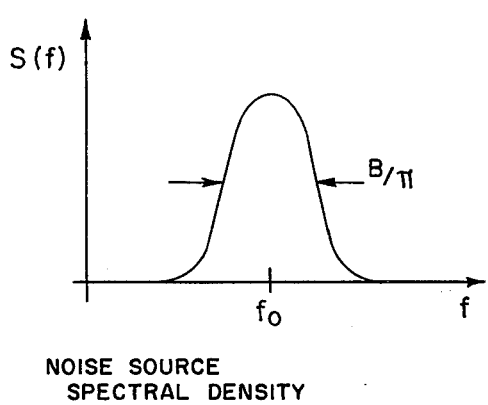
FIGS. 2A and 2B are is a graphic representations of the output signals of the system.
Figure 2B:
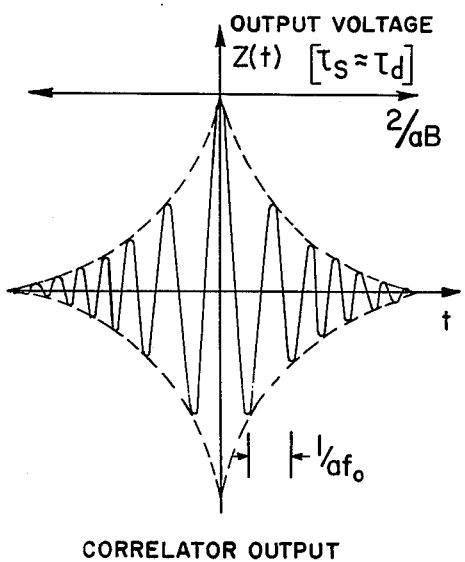

$\theta$ and $\phi$ are the angles made by the transmitting and receiving transducers with the direction of flow. The time average of the correlator output $Z(t)$ will be proportional to $$Z(t) \propto E\{A \times [(1+\alpha)t - \tau_s] \times [t - \tau_d]\} = \overline{A}R\,[\alpha t - (\tau_s - \tau_d)], \qquad \text{Equation (8)}$$

where $\overline{A}$ is the time average of the scattering cross section and $\tau_d$ is the reference delay imposed on a sample of the transmitted signal by the delay line (see FIG. 1). $R[\tau]$ is the autocorrelation function of the transmitted noise which is known to be equal to the inverse Fourier transform of the transmitted power spectral density. For example, for a transmitted spectral density $$S(f) = \frac{2B}{B^2 + [2\pi(f - f_o)]^2} \qquad \text{Equation (9)}$$

shown in FIG. 2 (a) the time average of the correlator output will be $$Z(t) = \overline{A}e^{-B|\alpha t - (\tau_s - \tau_d)|} \cos 2\pi f_o (\alpha t - \tau_s + \tau_d) \qquad \text{Equation (10)}$$

as shown in FIG. 2 (b). Thus a single scatterer passing through the "range cell," i.e., that region where $\tau_s \sim \tau_d$, will produce a correlator output of the form $e^{-B|\alpha t|} \cos 2\pi f_o \alpha t$. This signal can be seen to be a burst at the doppler shift frequency, $\alpha f_o$, of approximate duration $2/\alpha B$. The spectrum $S_z(f)$ of this burst due to a single scatterer, is of width $\alpha B \pi$, and consists of a compressed version of the original transmitted spectrum, centered around the doppler shift frequency; that is:

$$S_z(f) = \frac{2\alpha B}{(\alpha B)^2 + [2\pi(f - \alpha f_o)]^2} \qquad \text{Equation (11)}$$

The fact a single particle leads to a finite width doppler spectrum is due to the limited time it spends in the range cell and can be shown to be identical to the transit time broadening found in conventional pulsed doppler systems. If a distribution of scatterers travelling at constant velocity pass through the range cell at random time intervals the correlator output spectrum is unchanged from that of a single scatterer. In fact, the correlator output spectrum produced by a noise system observing a distributed target such as moving blood can only depend on the spectral density of the transmitted signal. Thus, the relation between the doppler output spectrum and the transmitted spectrum is the same whether the transmitted ultrasonic signal is a burst of constant frequency or a stationary random signal.

There is a great advantage in using the random signal doppler because it does not suffer from the range ambiguity restriction on transmitted signal repetition rate as given in Equation 1. In a random signal doppler in which every signal is different from every other, an echo from any one burst cannot correlate with any other burst. Consequently, there is no upper limit on the repetition rate of the transmitted signal. (It is shown below in fact that this signal can be continuous). Hence the maximum range-velocity limit shown in Equation 3 for a conventional Pulsed Doppler Ultrasonic Flowmeter does not apply to a random signal doppler which can thus operate at any range.

The expression for $Z(t)$ in Equation 10 shows that for a stationary target the correlator output approaches zero when $\Delta\tau = \tau_s - \tau_d > 1/B$. The range resolution of the noise system can therefore be written:

$$\Delta R = \frac{c}{2B}$$

which is exactly the same expression as the one shown in Equation 5 relating the range resolution and bandwidth of a conventional pulsed doppler system. The random signal system has an advantage over conventional systems however, in that its range resolution, dependent only on transmitted bandwidth, is independent of the transmitted pulse duration. For this reason, transmitted power in the random signal system can be spread over a much longer time interval than that for pulsed doppler systems. Since the sensitivity of optimized random signal and pulsed doppler systems can be shown to depend in the same way on the average transmitted power, the ratio of peak to average transmitted power can be made smaller in the random signal system then in the known pulsed doppler systems.

Figure 3:
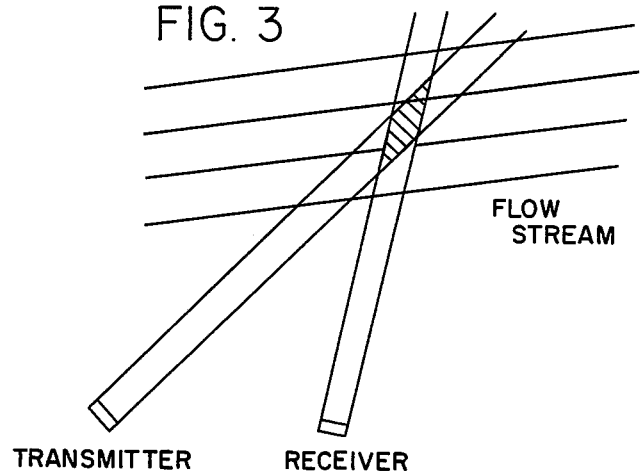
FIG. 3 is a graphic showing of an aimed system.

Unfortunately, if noise is transmitted continuously, reverberation type echoes from targets outside the range cell add in an uncorrelated manner to the desired signal, worsening the system signal-noise ration. In many applications these reverberation echoes can be tolerated, but if this cannot be tolerated, and if the various strongly reflecting targets are far apart, this problem can be overcome by transmitting bursts of noise which are short enough to only intercept one target at a time. Such procedures necessarily increase the ratio of peak to average transmitted power. A better means of avoiding clutter, one which does not impose restrictions on the transmitted signal, (so that the device may still utilize a continuous signal and still retain high sensitivity) is to arrange for the transmitting and receiving transducer patterns to only intercept in the region of the range cell, as shown in FIG. 3. Inspection of this arrangement shows that only echoes from the cross-hatched region are detected by the receiver. Echoes from other points of the transmitted beam approach the receiver at angles for which the receiving transducer is not sensitive. In this way reverberation noise can be reduced by an order of magnitude or greater.

Figure 4A:
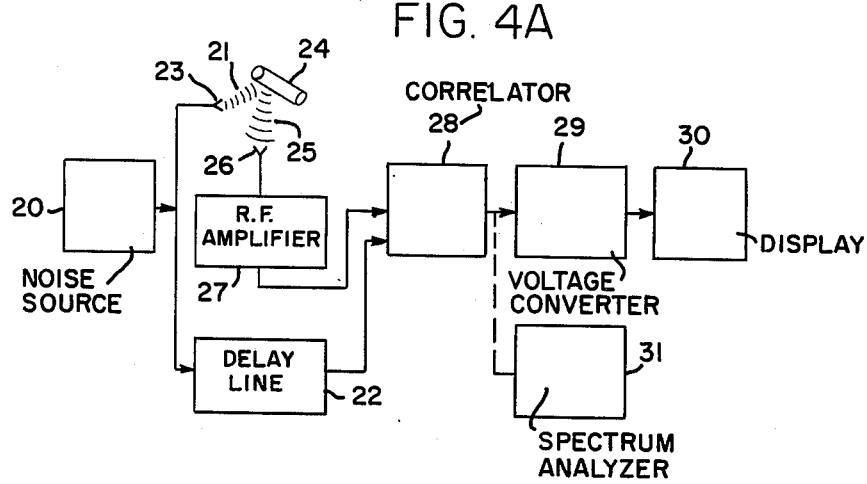
FIGS. 4A and 4B are block diagrams of a double transducer system, detailing the digital correlator.
Figure 4B:
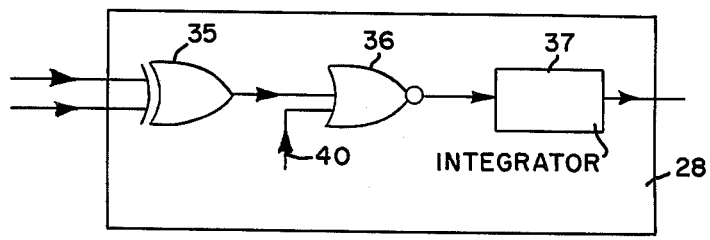

One embodiment of a random signal ultrasound flow measurement system was made using separate transducers for transmitting and receiving, as shown in FIG. 4. FIG. 4 shows a double transducer system tested experimentally for flow measurement, a noise source 20 produces electrical output signals which are sent to the delay line 22 and to the transmitting transducer 23 as described in connection with FIG. 1. The echoes 25 from the target 24 resulting from this signal are reconverted into electrical signals by the receiving transducer 26 which transmits them to the R.F. amplifier 27 from where they go to the digital correlator 28. The correlator 28 is also fed with the signals that are passed through the variable delay line 22. The output of the digital correlator 28 is fed either through a frequency to voltage converter 29 and thence to a catheter type display 30, or to a spectrum analyzer 31 which incorporates its own display. The detail of the digital correlator 28 is seen to exist of an exclusive-or gate 35 followed by a nor gate 36 followed by an integrator 37. The nor gate 36 is driven by an inhibit line 40 whose function is described hereinafter in connection with FIG. 5.

Figure 5:
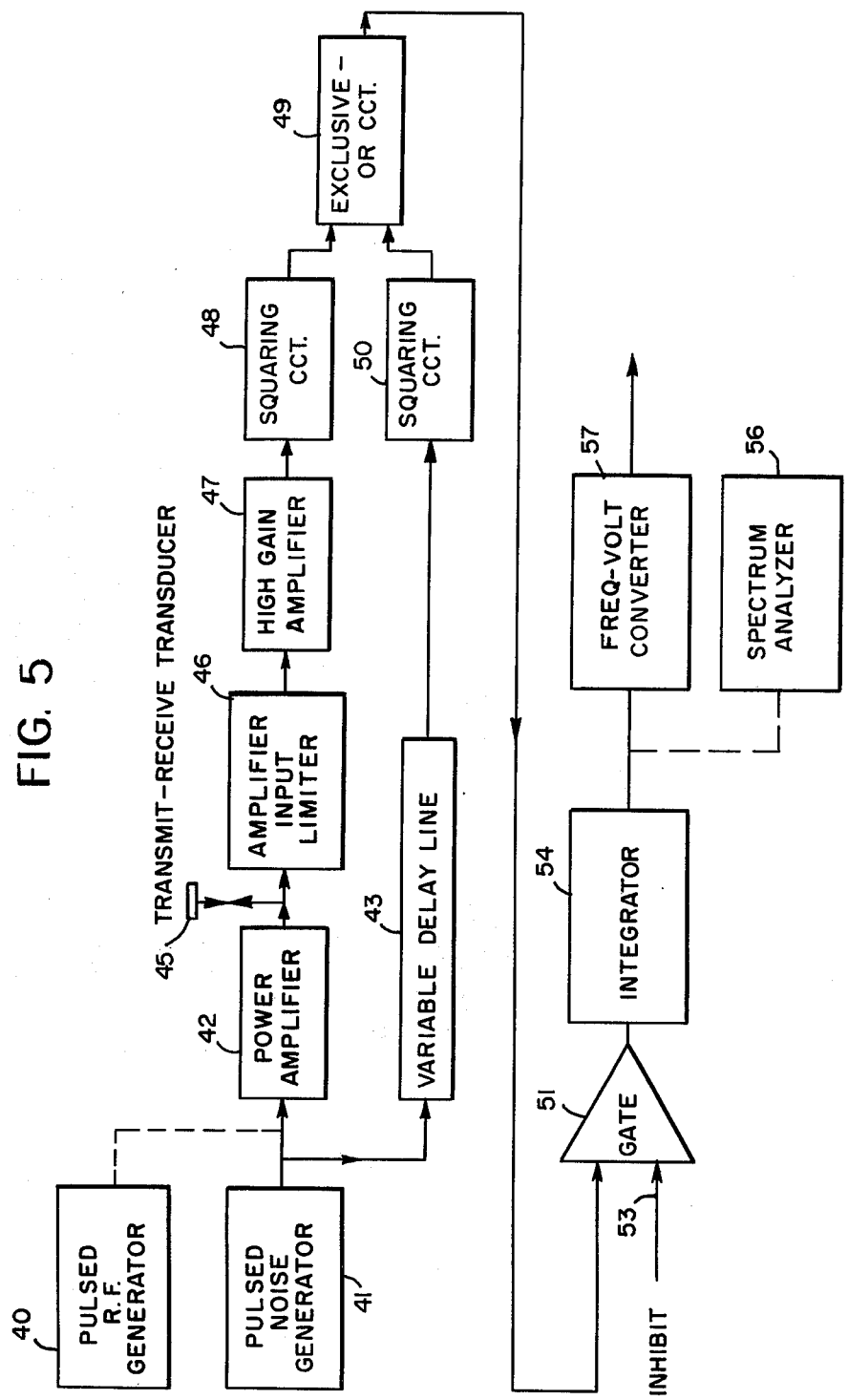
FIG. 5 is a block diagram of a single transducer random signal system.

Another embodiment of the present invention employs a single transducer system, such as that shown in FIG. 5. FIG. 5 represents a single transducer flow measurement system which has been tested experimentally. Either a pulsed rf generator 40 or a pulsed noise generator 41 feeds signals to the power amplifier 42 into the variable delay line 43, which delay line can include a multiple, or plurality, of ultrasonic transducers. The power amplifier 42 transmits signals through the transducer 45, these in the form of acoustic waves. The echoes from the flow to be measured are reconverted into electrical signals by the transducer 45 and fed through the input limiter 46, the high gain amplifier 47 and the squaring circuit 48 to the exclusive or circuit 49. This is also fed by signals passing through the delay line 43 and the other squaring circuit 50. The output of the exclusive-or circuit 49 passes to the gate 51 which corresponds to the nor gate described in connection with FIG. 4. The nor gate 51 is fed by an inhibit signal 53 (except during reflected signal reception) which insures that the integrator 54 fed by the gate 51 only receives signals during the time that an echo from the flow being measured arrives at the gate. The output of the integrator 54 is fed to either a spectrum analyzer 56 or a frequency to voltage converter 57. The major difference between this system and the two transducer system mentioned above is that power can be transmitted for a maximum of 50% of the time, and that rather elaborate electronics is required to block the transmitter during the time the transducer is receiving. This requirement (which also holds for conventional pulsed doppler systems) arises from the fact that scattering from targets such as blood cells can easily be 60 dB weaker than the transmitted signal.

The pulsed noise generator produces periodic bursts of noise which are transmitted and also sent through the variable delay line. The receiver amplifier input limiter circuit protects the high gain amplifier from overload during transmission. Both the echo and the delay reference signal are then clipped. This gives a slight reduction in signal-noise ratio, but allows the multiplication aspect of the correlator function to be performed by a very simple digital exclusive-or circuit. The correlator output signal is passed through a low pass filter for integration and displayed via either a spectrum analyzer or a frequency-voltage converter. A frequency shifting network (of the double mixer type) can be incorporated into the system to detect the direction as well as the magnitude of the flow.

Other well known techniques for distinguishing approaching from receding fluid involving phase quadrature techniques may also be used in these systems. By simply replacing the pulsed noise source with the pulsed RF source the system operates in a conventional pulsed doppler mode without the aforementioned ambiguity problems and peak power/average transmitted power problems of the conventional pulsed doppler systems.

The low peak to average transmitted power ratio of the random signal doppler system will be of advantage in giving such systems extra range when used in fluid media. This is so because the range of conventional pulsed echo systems is often limited by electrical breakdown which occurs in the transducers when a certain maximum peak transmitted power is exceeded. The range of conventional pulsed doppler flow meters is not limited by this effect since their range is usually much more strongly limited by the velocity range product maximum, as defined in Equation 3.

What is claimed is:

1. A flow measurement device comprising:
   a stationary random noise source having an output signal in the ultrasonic range;
   a transmitter to transmit said output signal toward a target in a flowing medium, said target reflecting signals in said ultrasonic range;
   a delay means connected with said noise source to receive the output signal coupled to said transmitter;
   a receiver to receive said output signal when reflected back from said target; and
   signal processing means connected with said delay means and said receiver to receive the output therefrom and responsive thereto producing an output indicative of the frequency shift between said output signal as transmitted and received, said frequency shift being indicative of the flow rate of said medium.

2. The flow measurement device according to claim 1 in which the output signal is substantially continuous whereby the ratio of peak power transmitted to average transmitted power is minimized.

3. The flow measurement device according to claim 1 in which said delay means includes multiple ultrasonic transducers.

4. The flow measurement device according to claim 2 in which the receiver is aimed to admit only signals received from a preselected angle of approach whereby reverbrations and clutter are filtered out of the signal received by said receiver.

5. A flow measurement device comprising:
   a stationary random noise source having an output signal in the ultrasonic range;
   a transducer operatively connected to said random noise source to transmit said output signal toward an ultrasonic range signal reflecting target and receive said output signal when reflected from said target when under movement;
   a delay circuit connected with said noise source to receive said output signal simultaneously with the transmission of said signal from said transducer; and
   signal processing means connected with said delay circuit and said transducer to receive said output signal and said reflected output signal therefrom, respectively, said signal processing means responsive to receiving said output signal and said reflected output signal producing an output that is indicative of the frequency shift between said signals, said frequency shift reflecting the rate of movement of said target.

6. The flow measurement device of claim 5 wherein said flow measurement device includes a high gain amplifier and a receiver input limiter means adapted to protect the high gain amplifier from overload during transmission.

7. The flow measurement device of claim 5 wherein said signal processing means includes an integrator and means to preclude processing of a signal to said integrator during transmission of said output signal.

* * * * *